US011925199B1

(12) United States Patent
Elmais

(10) Patent No.: US 11,925,199 B1
(45) Date of Patent: Mar. 12, 2024

(54) AUTOMATIC SANDWICH MACHINE

(71) Applicant: Omar Mahmoud Elmais, Jdita (LB)

(72) Inventor: Omar Mahmoud Elmais, Jdita (LB)

(*) Notice: Subject to any disclaimer, the term of this patent is extended or adjusted under 35 U.S.C. 154(b) by 0 days.

(21) Appl. No.: 18/136,512

(22) Filed: Apr. 19, 2023

(51) Int. Cl.
| | | |
|---|---|---|
| *A21C 15/00* | (2006.01) | |
| *A23P 20/20* | (2016.01) | |
| *A47J 37/04* | (2006.01) | |
| *A47J 47/01* | (2006.01) | |
| *B26D 3/24* | (2006.01) | |
| *B65B 25/00* | (2006.01) | |
| *B65B 35/50* | (2006.01) | |
| *B65G 47/90* | (2006.01) | |

(52) U.S. Cl.
CPC ............. *A23P 20/20* (2016.08); *A21C 15/00* (2013.01); *A21C 15/002* (2013.01); *A47J 37/043* (2013.01); *A47J 37/044* (2013.01); *A47J 47/01* (2013.01); *B26D 3/24* (2013.01); *B65B 25/001* (2013.01); *B65B 35/50* (2013.01); *B65G 47/907* (2013.01); *B65G 2201/0202* (2013.01)

(58) Field of Classification Search
CPC ...... A21C 15/00; A21C 15/002; A47J 37/043; A47J 37/044; A47J 47/01; B26D 3/24; B65B 25/001; B65B 35/50; B65G 47/907
USPC ........................................................ 99/450.5
See application file for complete search history.

(56) References Cited

U.S. PATENT DOCUMENTS

| 1,741,682 A * | 12/1929 | Desmond ................. B26D 3/24 30/130 |
| 3,266,541 A * | 8/1966 | Kluytenaar ......... B65B 69/0033 83/72 |
| 3,377,963 A * | 4/1968 | Anderson ................. A22C 7/00 366/276 |
| 3,378,052 A * | 4/1968 | Dekker .................. G01G 13/00 83/77 |
| 3,828,660 A * | 8/1974 | Mueller ................. A23G 9/286 53/550 |
| 4,202,260 A * | 5/1980 | Weger .................. A21C 15/002 401/5 |
| 5,113,753 A * | 5/1992 | Robinson ............... A47J 37/045 99/357 |
| 5,186,098 A * | 2/1993 | Miller ...................... A21C 9/04 118/16 |
| 5,306,192 A * | 4/1994 | Caveza .............. A63H 33/3055 446/481 |
| 7,757,859 B1 * | 7/2010 | Grossman ............ A47G 21/001 426/115 |

(Continued)

*Primary Examiner* — Eric S Stapleton
(74) *Attorney, Agent, or Firm* — Georgiy L. Khayet

(57) ABSTRACT

An automatic sandwich machine is provided. The machine receives customer selections for a number of sandwiches and combinations of toppings and sauces, and allows the customer to make a payment for the sandwiches. The machine places a bread piece into a bread heater, and while the bread heater is heating the bread piece, sprays sauces according to the customer selection and prepares a pre-determined amount of toppings according to a customer selection, a pre-determined amount of sliced meat from a grilled sandwich cone, and a pre-determined amount of cheese. The machine places toppings, sliced meat, and cheese onto the bread piece. The machine then wraps the bread piece to obtain a sandwich. Thereafter, the machine roasts the sandwich and places it into a packet. Finally, the machine delivers the packet with the sandwich to the customer via an outlet.

10 Claims, 15 Drawing Sheets

(56) References Cited

U.S. PATENT DOCUMENTS

| | | | | |
|---|---|---|---|---|
| 9,532,575 B1* | 1/2017 | Donisi | | A21C 15/007 |
| 10,271,558 B1* | 4/2019 | Donisi | | A21C 15/002 |
| 2001/0013276 A1* | 8/2001 | McConnell | | A47J 37/044 |
| | | | | 99/450 |
| 2002/0014054 A1* | 2/2002 | Dharssi | | B65B 5/045 |
| | | | | 53/415 |
| 2003/0091699 A1* | 5/2003 | Valenzky, Jr. | | A21D 13/32 |
| | | | | 426/94 |
| 2003/0155369 A1* | 8/2003 | Frem | | G07F 17/0078 |
| | | | | 221/92 |
| 2004/0020164 A1* | 2/2004 | Dharssi | | B65B 61/20 |
| | | | | 53/238 |
| 2004/0238555 A1* | 12/2004 | Parks | | G07F 9/105 |
| | | | | 221/80 |
| 2006/0162579 A1* | 7/2006 | Sinatra | | A21C 15/007 |
| | | | | 99/537 |
| 2006/0182852 A1* | 8/2006 | Wojciak | | A23P 20/10 |
| | | | | 426/274 |
| 2006/0263495 A1* | 11/2006 | Langton | | B65D 57/004 |
| | | | | 426/132 |
| 2008/0250754 A1* | 10/2008 | Spencer | | A23G 7/0043 |
| | | | | 53/230 |
| 2011/0159153 A1* | 6/2011 | Engstrom | | A21D 15/02 |
| | | | | 426/94 |
| 2013/0067858 A1* | 3/2013 | Spears | | B65B 35/10 |
| | | | | 53/122 |
| 2015/0024107 A1* | 1/2015 | Dzieduszycki | | A21D 13/36 |
| | | | | 426/549 |
| 2017/0095112 A1* | 4/2017 | Baker | | A47J 36/00 |
| 2017/0137157 A1* | 5/2017 | Irwin | | B65B 57/00 |
| 2019/0059645 A1* | 2/2019 | Nelson | | A47J 37/0611 |
| 2021/0122585 A1* | 4/2021 | Johnson | | B65G 47/914 |
| 2021/0127730 A1* | 5/2021 | Saccone, Jr. | | B26D 7/0625 |
| 2021/0169120 A1* | 6/2021 | Claussen | | B25J 11/0045 |
| 2021/0219592 A1* | 7/2021 | Claussen | | B26D 11/00 |
| 2022/0117243 A1* | 4/2022 | Brusilovski | | A21D 13/32 |

* cited by examiner

AUTOMATIC SANDWICH MACHINE

TECHNICAL FIELD

This disclosure generally relates to the field of food preparation and, more particularly, to apparatuses and methods for preparing sandwiches.

BACKGROUND

Sandwiches are some of the most popular fast food worldwide. For example, preparation of donair sandwiches includes roasting meat (e.g., chicken, lamb, and veal) on a rotating spindle in a grilling device. The meat can rotate slowly against heating elements. The heating elements do not touch the meat while applying heat to the outer layer of the meat. When the outer layer is cooked, it is cut in thin slices. The thin slices are placed together with additives, such as sauces and toppings, on a piece of bread. The piece of bread is then wrapped to form a sandwich. The recited operations are typically performed manually by skilled workers. However, even a skilled worker cannot uniformly add the same amount of meat, sauces, and toppings to each sandwich. This results in waste of products, extra expenses for producing sandwiches, and, consequently, unnecessary extra charges for the customers.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

This disclosure is directed to methods and apparatuses for automatically preparing sandwiches. According to one example embodiment, an automatic sandwich machine is provided. The automatic sandwich machine may include an electronic device, a bread stacking device, a first arm, a bread heater, a second arm, a main conveyor, a topping section, a sandwich grilling and slicing section, a cheese section, a wrapping section, a third arm, a roasting section, a fourth arm, and a packaging and outlet section.

The electronic device may receive a customer selection of a content of at least one sandwich. The bread stacking device may store a stack of a pre-determined number of bread pieces. The bread pieces can include pitas, tortillas, and the like. The first arm may transfer a bread piece from the stack to the bread heater and place at least one sauce on the bread piece. The at least one sauce can be selected based on the customer selection. The bread heater may heat the bread piece.

The second arm can transfer the bread piece from the bread heater to the main conveyor. The main conveyor can move the bread piece to the wrapping section. The main conveyor may include two boards to partially wrap two opposite sides of the bread piece. The topping section can apply a combination of toppings to the bread piece. The combination of toppings can be selected based on the customer selection. The sandwich grilling and slicing section can include a sandwich heater (a main sandwich heater) to grill a primary sandwich cone and a cutting mechanism to cut a pre-determined amount of meat from the primary sandwich cone, and place the pre-determined amount of meat on the bread piece. The level of readiness of the outer surface of the primary sandwich cone and time of cutting the outer surface can be controlled by using photosensors configured to determine the color of the primary sandwich cone. Additionally, the level of readiness of the meat can be measured by temperature sensors. When the temperature of the outer surface of the meat reaches a pre-determined level, the outer surface of the meat can be sliced by the cutting mechanism. The cheese section can apply a pre-determined amount of cheese to the bread piece and push the bread piece into the wrapping section to prepare for wrapping of the bread piece. The wrapping section can wrap the bread piece with the at least one sauce, the combination of toppings, the pre-determined amount of meat, and the pre-determined amount of cheese to form the at least one sandwich.

The third arm can transfer the sandwich from the wrapping section to the roasting section. The roasting section can roast the at least one sandwich. The fourth arm can transfer the at least one sandwich from the roasting section to the packaging and outlet section. The packaging and outlet section can place the sandwich into a packet and move the packet with the at least one sandwich to an outlet.

The first arm can transfer the bread piece along a first direction. The main conveyor can move the bread piece along a second direction, where the first direction is substantially orthogonal to the second direction.

The first arm may include a set of vacuum suction pads. The set of vacuum suction pads can hold and release the bread piece and a set of nozzles. The set of nozzles can dispense the at least one sauce when the first arm moves from the bread heater to the bread stacking device. The automatic sandwich machine may include a set of sauce containers disposed below the bread heater. The set of sauce containers may supply the at least one sauce to the set of nozzles via a set of hoses. The set of sauce containers may include two containers storing at least one sauce.

The sandwich grilling and slicing section can prepare the pre-determined amount of meat, the cheese section can prepare the pre-determined amount of cheese, and the topping section can prepare the combination of toppings while the bread heater is heating the bread piece.

The automatic sandwich machine may further include a cone freezer. The sandwich grilling and slicing section may also include a further sandwich heater. The cone freezer stores a replacement sandwich cone. The cone freezer can be cooled by a compressor. The sandwich grilling and slicing section may include a cone changing mechanism. The cone changing mechanism automatically replaces the primary sandwich cone with the replacement sandwich cone. Specifically, once the primary sandwich cone is close to being completely used, the cone changing mechanism retrieves the replacement sandwich cone from the cone freezer and places it against the further sandwich heater to start cooking. Once the primary sandwich cone is finished, the cone changing mechanism removes the primary sandwich cone from the main sandwich heater and places the replacement sandwich cone against the main sandwich heater. The finished primary sandwich cone is then moved to the cone freezer.

The cheese section can be disposed above the wrapping section. The cheese section may add the pre-determined amount of cheese to the bread piece and push the bread piece into a mold of the wrapping section.

The electronic device includes a point-of-sale enabling a customer to pay for at least one sandwich.

According to another example embodiment, a method for preparing sandwiches is provided. The method may include providing an automatic sandwich machine including an electronic device, a bread stacking device, a first arm, a bread heater, a second arm, a main conveyor, a topping section, a sandwich grilling and slicing section, a cheese section, a wrapping section, a third arm, a roasting section, a fourth arm, and a packaging and outlet section.

The method may include receiving, by the electronic device, a customer selection of a content of at least one sandwich. The method may include storing, by the bread stacking device, a stack of a pre-determined number of bread pieces. The method may include transferring, by the first arm, a bread piece from the stack to the bread heater. The method may include placing, by the first arm, at least one sauce on the bread piece, the at least one sauce being selected based on the customer selection. The method may include heating, by the bread heater, the bread piece. The method may also include transferring, by the second arm, the bread piece from the bread heater to the main conveyor. The method may include moving, by the main conveyor, the bread piece to the wrapping section.

The method may include applying, by the topping section, a combination of toppings to the bread piece, the toppings being selected based on the customer selection. The method may include grilling, by the sandwich grilling and slicing section, a primary sandwich cone. The method may include cutting, by the sandwich grilling and slicing section, a pre-determined amount of meat from the primary sandwich cone. The method may include placing, by the sandwich grilling and slicing section, the pre-determined amount of meat on the bread piece. The sandwich grilling and slicing section may include a dispenser with a scale that determines the exact weight of the meat needed to be placed on the sandwich.

The method may include applying, by the cheese section, a pre-determined amount of cheese to the bread piece. The method may include wrapping, by the wrapping section, the bread piece with the at least one sauce, the combination of toppings, the pre-determined amount of meat, and the pre-determined amount of cheese to form the at least one sandwich.

The method may include transferring, by the third arm, the at least one sandwich from the wrapping section to the roasting section. The method may include roasting, by the roasting section, the at least one sandwich. The method may include transferring, by the fourth arm, the at least one sandwich from the roasting section to the packaging and outlet section. The method may include placing, by the packaging and outlet section, the at least one sandwich into a packet. The method may also include moving, by the packaging and outlet section, the packet with at least one sandwich to an outlet.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1B:
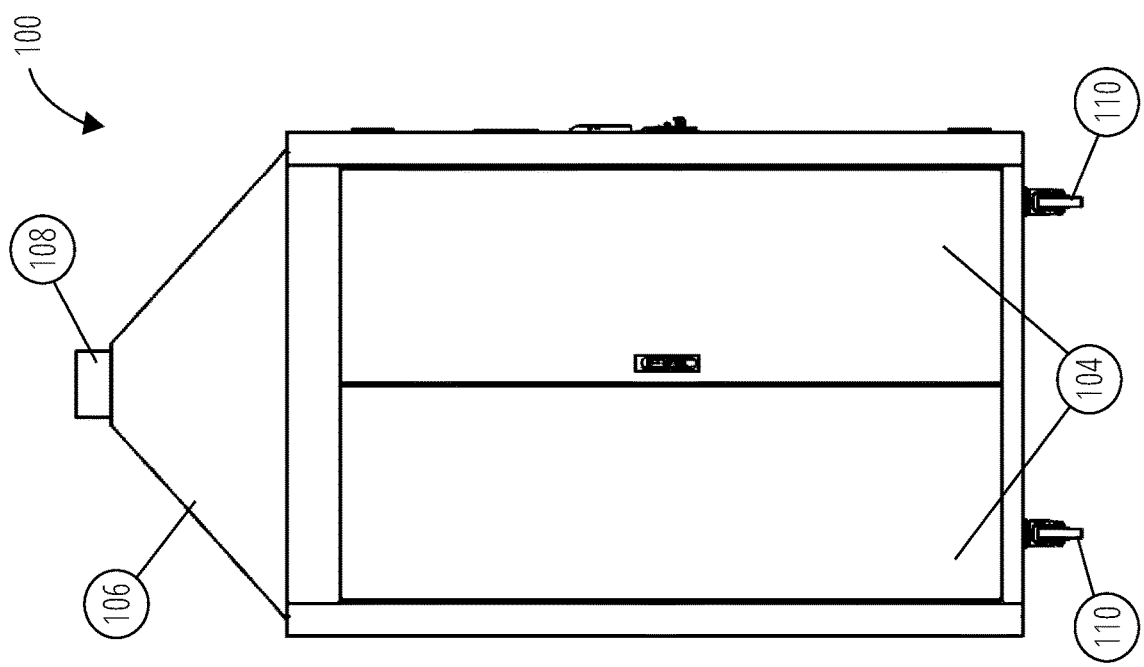
FIG. 1B is a side view of the automatic sandwich machine, according to an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Embodiments of this disclosure generally relate to automated meal preparation. More specifically, embodiments of the present disclosure relate to an automatic sandwich machine for producing sandwiches in a full automated process starting with receiving a customer selection of number and content of one or more sandwiches and ending with ready-to-eat sandwiches.

The automatic sandwich machine disclosed herein may facilitate overcoming problems inherent to manual preparation of sandwiches, such as unstable amounts of added sauces and toppings from one sandwich to another and waste of meat, sauces, vegetables, cheese, and other products. The indicated problems are solved by using, in the automatic sandwich machine disclosed herein, load cells to automatically weigh meat, vegetables, and cheese to be used in a sandwich. These problems are also solved by using, in the automatic sandwich machine disclosed herein, pneumatic valves and nozzles to spray accurate amounts of sauces. Thus, the automatic sandwich machine disclosed herein can ensure that each of the sandwiches includes substantially identical amounts of products. The automatic sandwich machine disclosed herein may also facilitate overcoming the problem of undercooked or overcooked meat that is inherent to manual preparation of meat. The automatic sandwich machine disclosed herein may also allow reducing the workspace typically needed to prepare sandwiches manually. The automatic sandwich machine disclosed herein may also allow reducing the amount of labor required to fulfill or replenish products into dispensers.

As used herein, a sandwich can consist of a combination of vegetables, cheese, meat, sauces, and other ingredients that are all wrapped in a piece of bread. The bread pieces used for preparing such sandwiches may include pitas, tortillas, lavash, focaccia, ciabatta, and the like. The meat may include what is typically used in donair, kebab, doner kebab, shawarma, gyro, al pastor, pita sandwich, and so forth, that is "rotisserie-style" or "spit-roasted" prepared meat. Such meat is typically cooked on a rotating spit or skewer, which allows the meat to cook evenly and stay juicy. The donair, kebab, doner kebab, shawarma, gyro, al pastor, and pita sandwich are all types of spit-roasted meats that are popular in many countries and cultures around the world. These sandwiches can be served as street food or in casual dining settings and are known for their bold flavors and unique combinations of meat, spices, and sauces.

A doner kebab, for example, is a popular street food in Middle Eastern and Mediterranean countries that is made from grilled meat (usually lamb or beef) served in a pita bread with vegetables and sauce. A donair is a variation of the doner kebab that may consist of seasoned beef or lamb cooked on a vertical spit and shaved off in thin slices, which are then served in a pita or wrap with vegetables, sauce, and sometimes cheese. A shawarma is a Middle Eastern dish made from meat (typically chicken or lamb) that is marinated in spices, then stacked on a vertical spit and slow-roasted for several hours. The meat is shaved off in thin slices and typically served in a pita or wrap with vegetables, sauce, and sometimes hummus or tahini. The gyro is a Greek dish that is made from meat (usually lamb or beef) that is seasoned with herbs and spices, then stacked on a vertical spit and cooked slowly until it is crispy on the outside and tender on the inside. The meat is shaved off in thin slices and typically served in a pita or wrap with vegetables, and sauce. An al pastor is a Mexican dish made from pork that has been marinated in a mixture of spices, chilies, and pineapple juice, then stacked on a vertical spit and cooked slowly until it is crispy on the outside and tender on the inside. The meat is shaved off in thin slices and typically served in a tortilla with vegetables, sauce, and sometimes pineapple chunks. A pita sandwich is a sandwich made using a pita bread, typically filled with meat, vegetables, and sauce.

The automatic sandwich machine of the present disclosure is designed to produce sandwiches that include but are not limited to the sandwiches mentioned above.

Figure 1A:
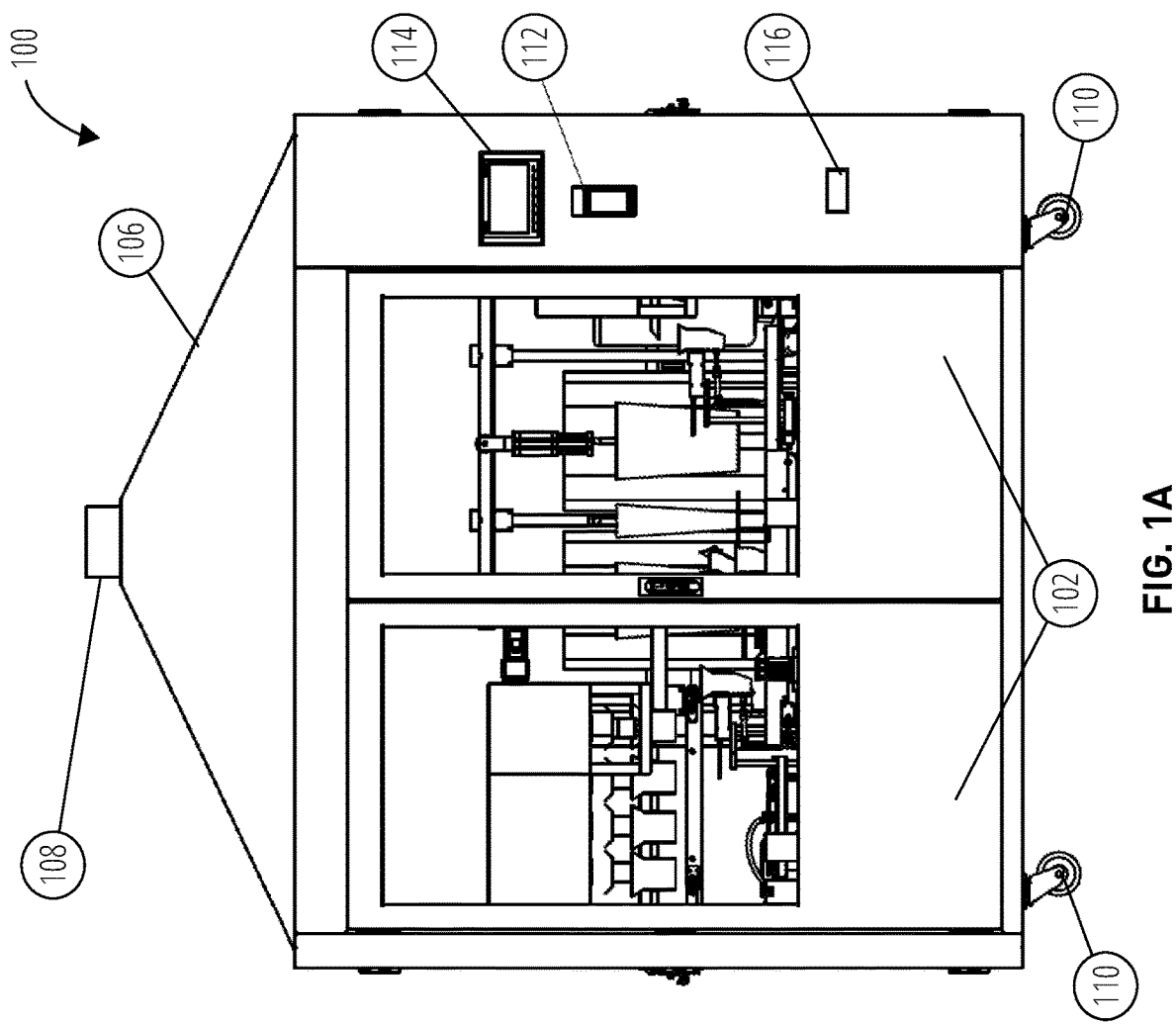
FIG. 1A is a front view of an automatic sandwich machine, according to an example embodiment.
Figure 1C:
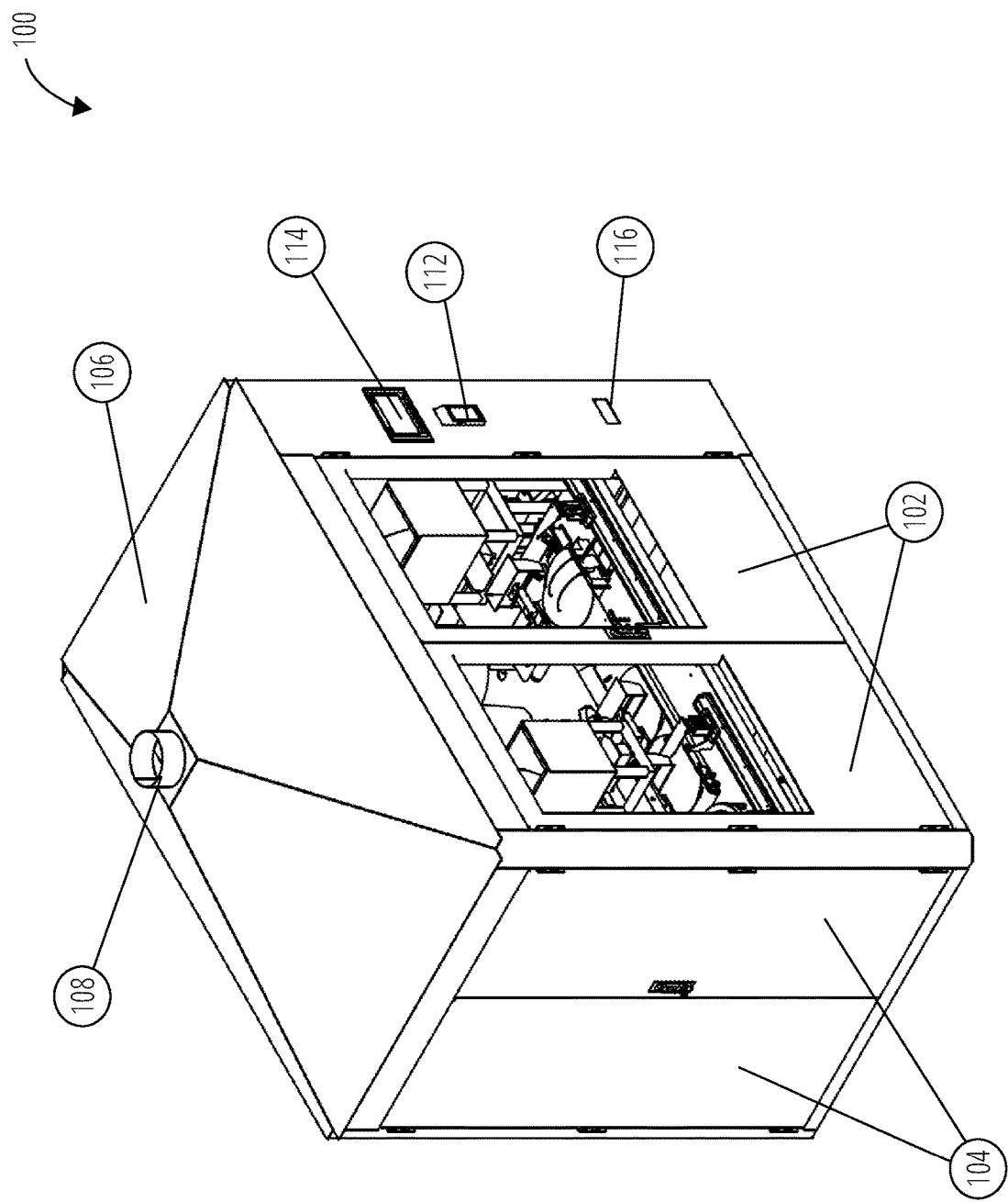
FIG. 1C illustrates an elevated view of the automatic sandwich machine, according to an example embodiment.

FIG. 1A is a front view of an automatic sandwich machine 100, according to an example embodiment. FIG. 1B is a side view of the automatic sandwich machine 100, according to an example embodiment. FIG. 1C illustrates an elevated view of the automatic sandwich machine, according to an example embodiment.

The automatic sandwich machine 100 may include front doors 102, side doors 104, a ventilation hood 106, a ventilation outlet 108, wheels 110, a point-of-sale (POS) device 112, a touch screen 114, and a check outlet 116. In an example embodiment, the dimensions of the automatic sandwich machine 100 can be, for example, 2464 millimeters (mm) in length, 1544 mm in width. The height of the automatic sandwich machine 100 can be, for example, 2867 mm in height (from the wheels to the ventilation outlet 108). In other embodiments, the height can be reduced by removing the ventilation hood 106 and the ventilation outlet 108.

The touch screen 114 can enable a customer to select a number of sandwiches, a combination of toppings for each of the sandwiches, and a combination of sauces for each of the sandwiches. The POS device 112 can accept payments from the customer for the sandwiches. A receipt for the customer order for sandwiches can be provided to the check outlet 116. In some embodiments, the touch screen 114 and the POS device 112 can be integrated into a single electronic device.

Figure 2:
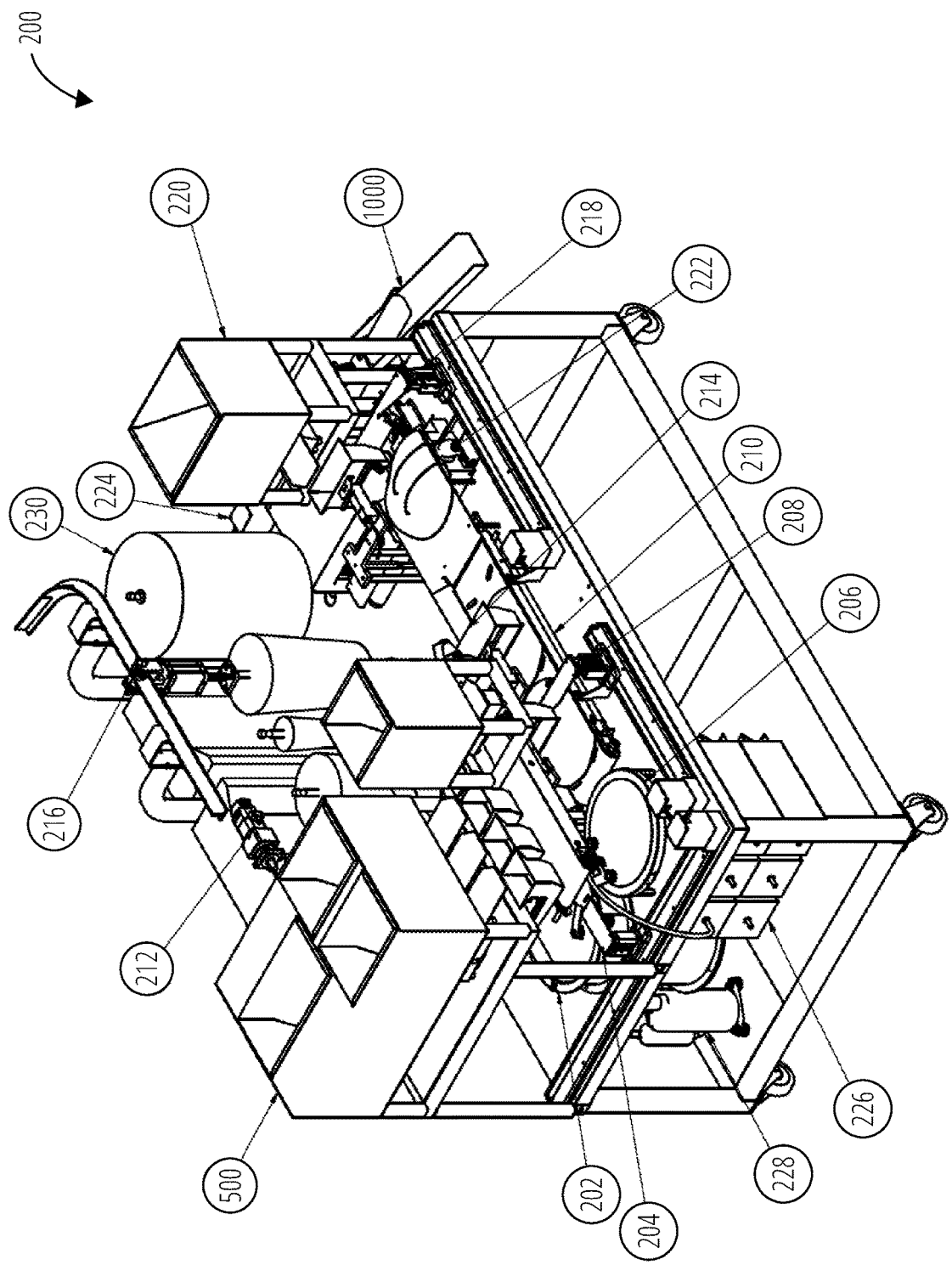
FIG. 2 illustrates sections of the automatic sandwich machine, according to an example embodiment.

FIG. 2 illustrates sections 200 of the automatic sandwich machine 100, according to an example embodiment. The automatic sandwich machine 100 may include a bread stacking device 202, a first arm 204, a bread heater 206, a second arm 208, a main conveyor 210, a topping section 500, a sandwich grilling and slicing section 212, a sandwich collecting and weighing section 214, a cone changing mechanism 216, a cone freezer 230, a third arm 218, a cheese section 220, a wrapping section 222, a sandwich roaster 224, a packaging and outlet section 1000, sauces containers 226, and a compressor 228.

The compressor 228 can be used both as a cooling and freezing compressor. The compressor 228 can provide cold for cone freezer 230 containing a replacement sandwich cone. The compressor 228 may also provide cooling for topping containers, sauces containers, and cheese containers, thereby allowing ingredients stored in these containers to remain fresh. Additionally, the compressor 228 can be used to regulate the temperature of the inside of the automatic sandwich machine 100 to keep the temperature within a certain range in order to comply with government regulations, for example, between 22 and 24 degrees Celsius to comply with the international Hazard Analysis Critical Control Point (HACCP) requirements.

The automatic sandwich machine 100 may further include a processor, sensors, electric motors, actuators, pneumatic cylinders, and pneumatic compressor to drive mechanisms of the automatic sandwich machine 100. The automatic sandwich machine 100 may also include an air blower fan to blow room temperature air on the glass of front windows (shown in FIG. 1A and FIG. 1C), to prevent forming of fog on the glass, thereby providing clear visibility of the inside of the automatic sandwich machine 100 to the customers. Additionally, the air can be vented outside the machine to allow customers to smell the cooking meat, thereby advertising the sandwiches by smell and increasing the probability of a sandwich purchase.

Figure 3:
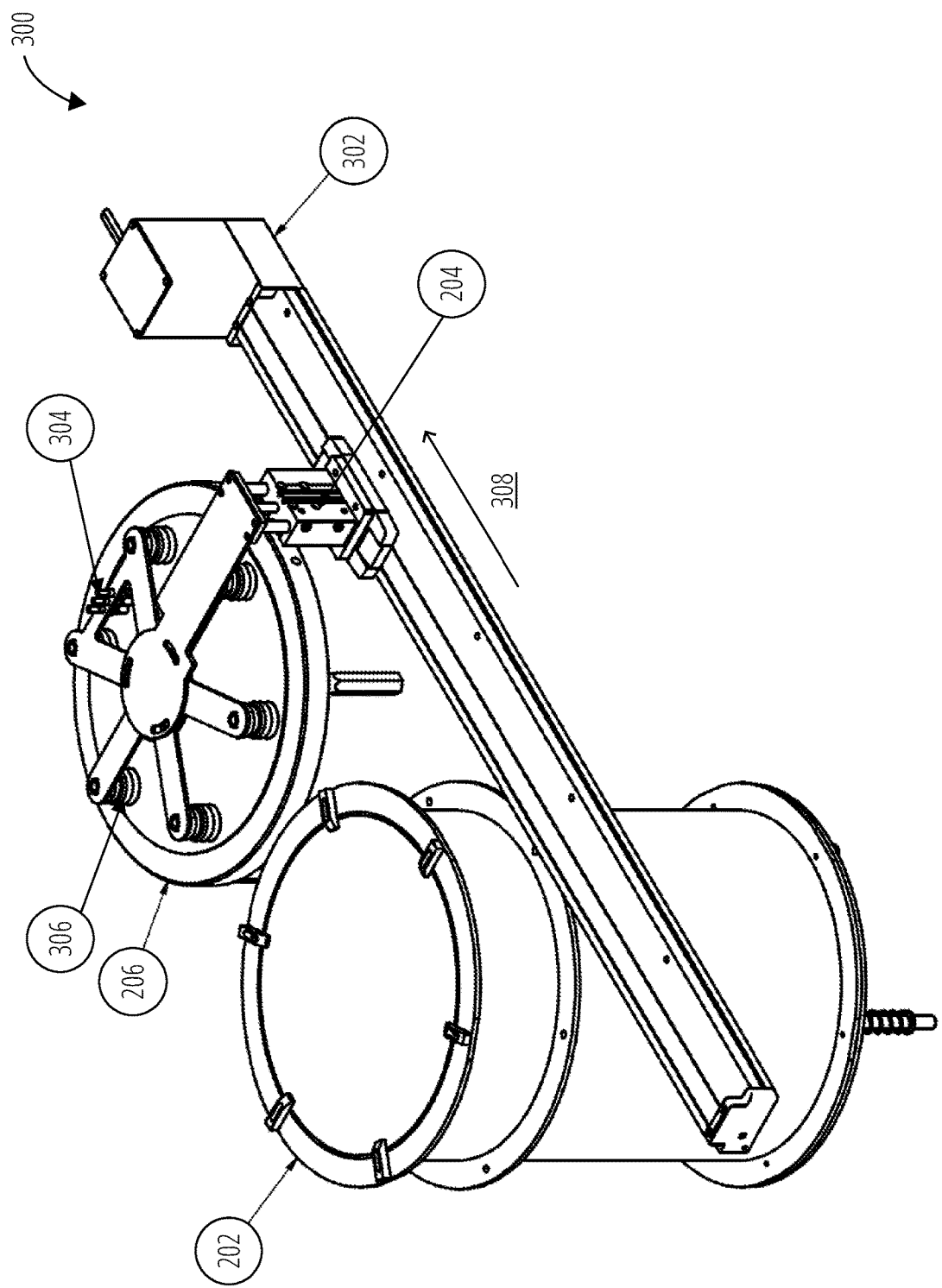
FIG. 3 illustrates a bread section of the automatic sandwich machine, according to an example embodiment.

FIG. 3 illustrates a bread section 300 of the automatic sandwich machine, according to an example embodiment. The bread section 300 includes a bread stacking device 202, a first arm rail 302, a first arm 204, a bread heater 206, a set of nozzles 304, and a set of vacuum suction pads 306.

The bread stacking device 202 can store a stack of bread pieces. In some embodiments, the number of bread pieces can be from 250 to 300 and each 50 bread pieces can be separated by metal plates. The first arm 204 can move along the first arm rail 302 in the first direction 308 and a direction opposite to the first direction 308. The first arm 204 may include a set of vacuum suction pads 306 and a set of nozzles 304. When positioned on top of the set of nozzles 304, the set of vacuum suction pads 306 can take a bread piece from the stack. Then the first arm 204 can move the bread piece to the bread heater 206 along the first direction 308. Once the first arm 204 is positioned on top of the bread heater 206, the set of vacuum suction pads 306 can release the bread piece, thereby placing the bread piece on top surface of the bread heater 206.

After placing the bread piece on the top surface of the bread heater 206, the first arm 204 can move back to the bread stacking device 202 for the next bread piece. During this move, the set of nozzles 304 can spray sauces on top of bread piece currently located on the bread heater 206. The sauces can be selected by a processor of the automatic sandwich machine 100 based on customer selection.

Referring back to FIG. 2, sauces containers 226 can be located under the bread heater 206. The sauces containers 226 may include serum bags holding the sauces, for example ketchup, mayonnaise, and mustard. The bags can be connected to the nozzles of the first arm 204 by hoses. The sauces can be provided to the nozzles by applying a pre-determined amount of pressure to the bags holding the sauces selected by the customer. Thus, the pre-determined amount of selected sauces can be sprayed onto the bread piece. The number of the sauces containers 226 can be at least twice the number of nozzles of the first arm 204, making at least two bags per type of sauces. When one of the two bags holding the same sauces gets empty, the processor of the automatic sandwich machine 100 may provide a warning message to an operator to replace the empty bag. In various embodiments, the number of sauces, the number of nozzles of the first arm 204, and the number of sauces containers 226 can be different from those indicated in FIG. 2 and FIG. 3.

Figure 4:
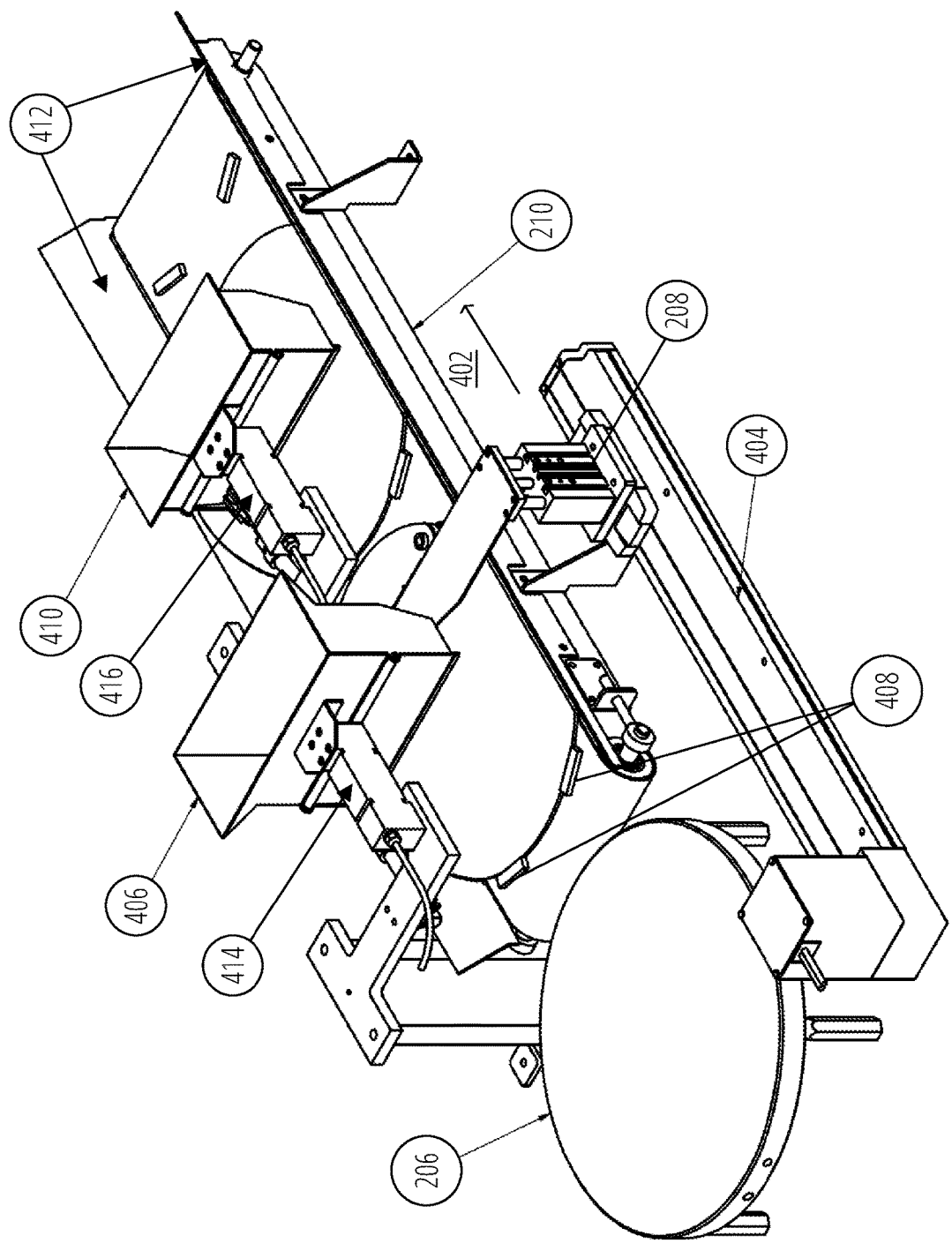
FIG. 4 illustrates a main conveyor of the automatic sandwich machine, according to an example embodiment.

FIG. 4 illustrates a main conveyor 210 of the automatic sandwich machine 100, according to an example embodiment. The main conveyor 210 can be arranged along a second direction 402. The second direction 402 can be substantially orthogonal to the first direction 308, which allows for compact arrangements of the bread stacking device 202, bread heaters 206, and main conveyors 210, thereby reducing dimensions of the automatic sandwich machine 100.

The second arm 208 may move between the bread heater 206 and the main conveyor 210 and along a second arm rail 404. The second arm 208 may include vacuum suction pads to grab a bread piece after the bread piece is heated by the bread heater 206. The second arm 208 can move the bread piece to the main conveyor 210, where the vacuum suction pads release the bread piece, thereby pacing the bread piece on the main conveyor 210 and under a topping collecting section 406. The main conveyor 210 may include restrictors 408 that facilitate holding the bread piece. Two boards 412 located at edges of the main conveyor 210 can bend two opposite sides of the bread piece while the bread piece is moved by the main conveyor 210.

The topping collecting section 406 may hold a combination of toppings prepared based on the selection of the customer. When the bread piece is positioned under the topping collecting section 406, the combination of toppings can be added on top of the bread piece. The topping collecting section 406 may include a door located at the bottom. The door can be opened by actuators to release the combination of toppings on the bread piece. The scales 414 can be used to weigh the toppings and trigger opening of the door when the pre-determined amount (weight) of the toppings is reached. After the toppings are released, the door can be closed by the actuators.

After the combination of toppings is added, the main conveyor 210 can move the bread piece to be positioned under a sandwich weighing device 410, where a pre-determined amount of meat is added on top of the bread piece. Similar to the topping collecting section 406, the sandwich weighing device 410 may include a door located at the bottom. The door can be opened by actuators to place the meat on the bread piece. The scales 416 can be used to measure (weigh) the amount of meat and trigger opening of the door when the amount of meat reaches the pre-determined amount of meat. After the toppings are released, the door can be closed by the actuators.

Figure 5:
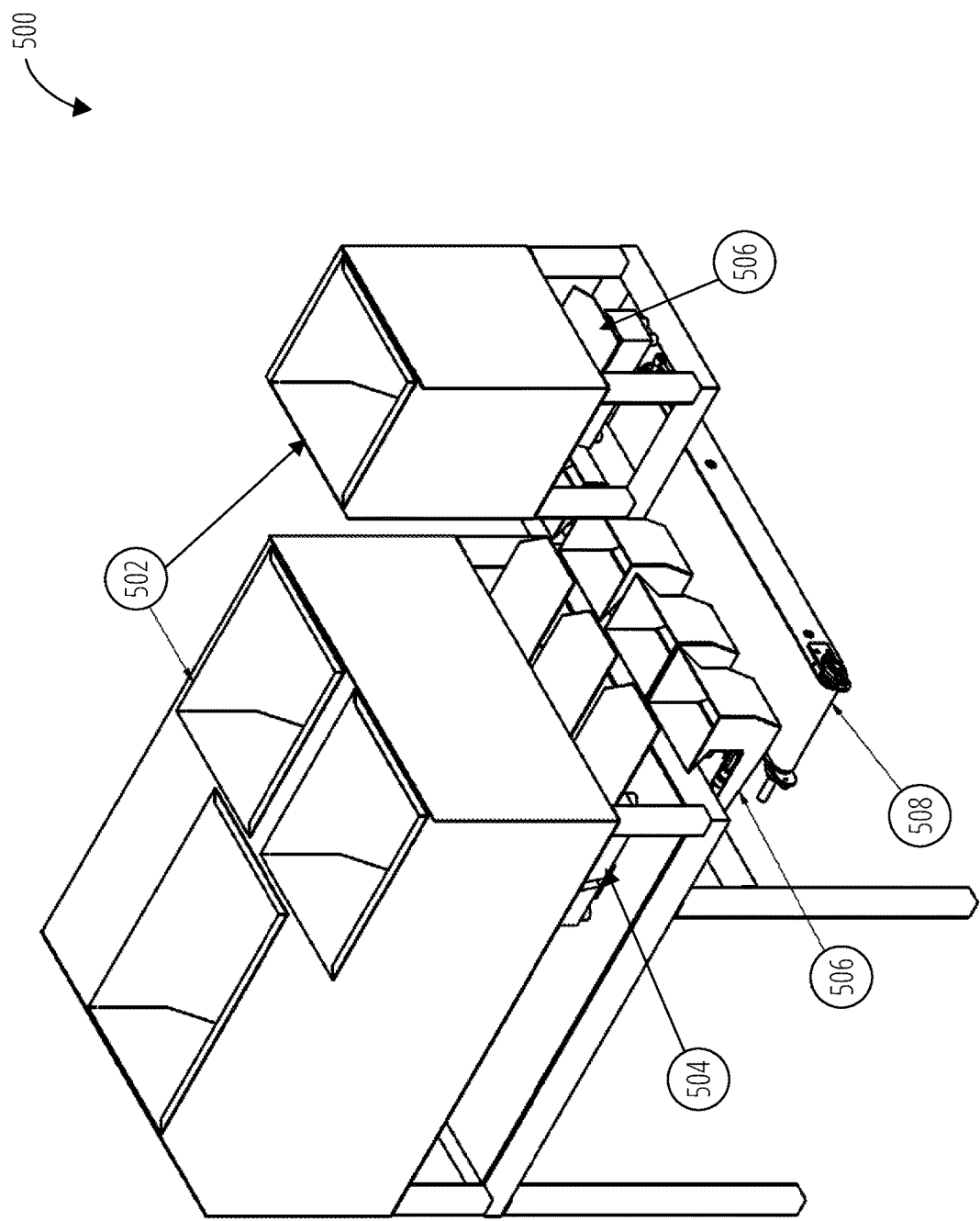
FIG. 5 illustrates a toppings section of the automatic sandwich machine, according to an example embodiment.

FIG. 5 illustrates a topping section 500 of the automatic sandwich machine 100, according to an example embodiment. The topping section 500 may include topping containers 502, vibrators 504, weighing containers 506, and topping conveyor 508. The topping containers 502 can be cooled by the compressor 228. The topping containers 502 can hold toppings, such as lettuce, corn, onions, and others. Number of topping containers 502 can be different from what is shown in FIG. 5.

The toppings can be poured into the weighing containers 506 by shaking the topping containers 502 using the vibrators 504. During this operation, only those vibrators 504 that correspond to topping containers that hold toppings selected by the customer can be activated. The weighing containers 506 each can release a topping, when the amount of the topping reaches a pre-determined weight and if the topping was selected by customer. The predetermined weight can be measured by weight sensors. When the amount of the topping reaches a pre-determined weight, the vibrators 504 can stop shaking the topping containers 502 to avoid wasting of the toppings. The toppings can be released on the topping conveyor 508. The topping conveyor 508 can pour the toppings to the topping collecting section 406 shown in FIG. 4.

Figure 6:
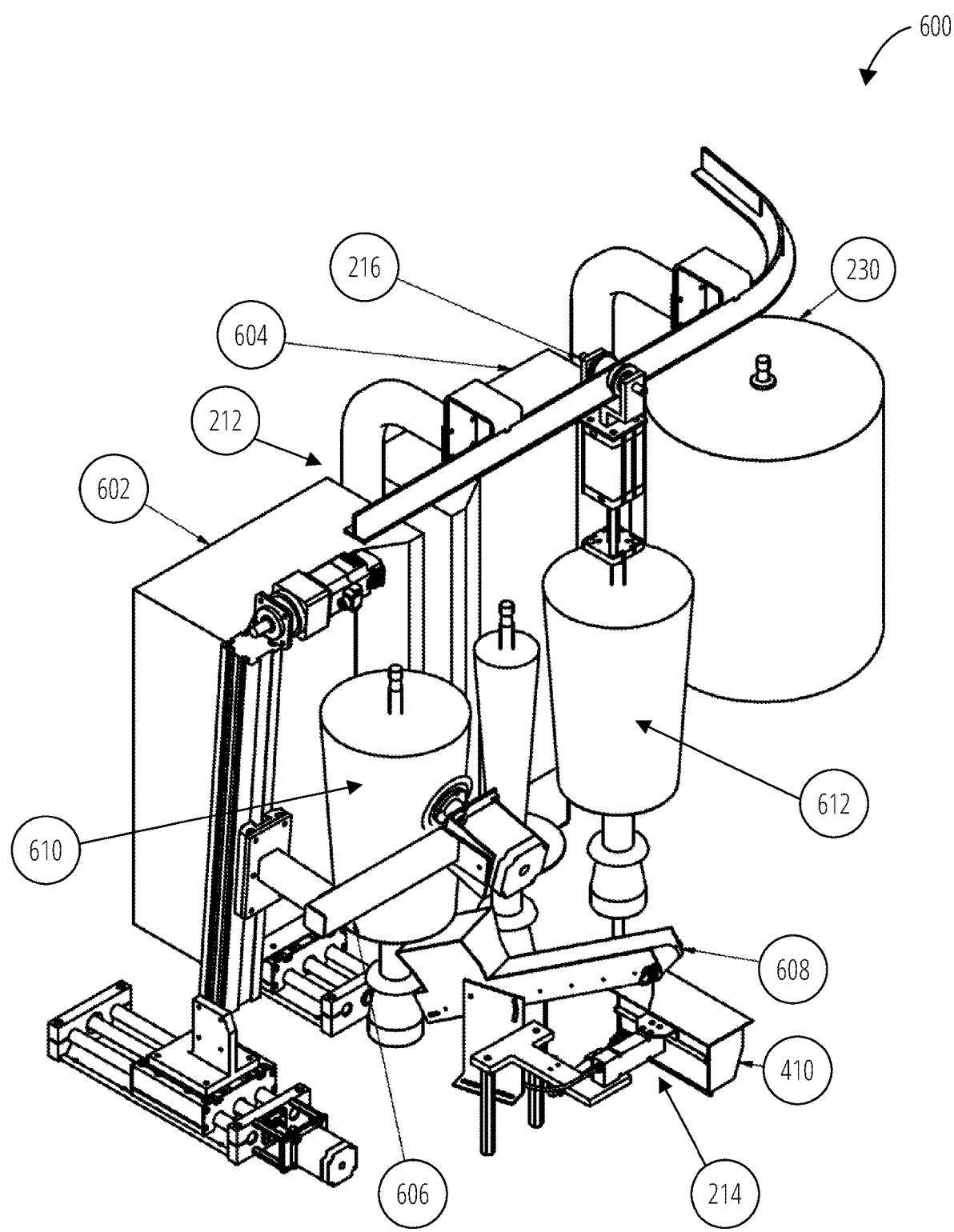
FIG. 6 illustrates a sandwich section of the automatic sandwich machine, according to an example embodiment.

FIG. 6 illustrates a sandwich section 600 of the automatic sandwich machine 100, according to an example embodiment. The sandwich section 600 may include a sandwich grilling and slicing section 212, a sandwich collecting and weighing section 214, a cone changing mechanism 216, and a cone freezer 230. The sandwich grilling and slicing section 212 may include a first sandwich heater 602, a second sandwich heater 604, a sandwich slicing device 606, temperature sensors, color sensors, photosensors, and infrared sensors (not shown). The sandwich collecting and weighing section 214 may include a sandwich conveyor 608 and a sandwich weighing device 410.

The meat on a primary sandwich cone 610 can be grilled by the sandwich heater 602 and sliced by the sandwich slicing device 606. The level of readiness of the outer surface of the primary sandwich cone 610 and time and level of cutting the outer surface can be controlled by using photosensors configured to determine the color of the primary sandwich cone 610. The level of readiness of the meat can also be measured by temperature sensors. After the temperature of the outer surface of meat reaches a desired value, the outer surface of the meat can be sliced. The sandwich slicing device 606 may include arms, electrical motors, slicing disc, and photosensors to help positioning the slicing disc along the surface of the primary sandwich cone 610.

The sliced meat can be collected by the sandwich conveyor 608. The sandwich conveyor 608 can transfer the sliced meat to the sandwich weighing device 410. After the sandwich weighing device 410 collects a pre-determined amount of meat, a processor of the automatic sandwich machine 100 can cause the sandwich slicing device 606 to stop slicing of the primary sandwich cone 610. The predetermined amount of meat can be measured by weight sensors. The predetermined weight can be measured by weight sensors. As described in FIG. 4, the sandwich weighing device 410 can release the meat on the bread piece when the bread piece is positioned by the main conveyor 210 under the sandwich weighing device 410.

Prior to starting the automatic sandwich machine 100, an operator can place a primary sandwich cone 610 in front of the sandwich heater 602 and a replacement sandwich cone 612 in the cone freezer 230. When the sliced primary sandwich cone 610 is close to being completely used, the cone changing mechanism 216 can transfer the replacement sandwich cone 612 from the cone freezer 230 to the sandwich heater 604 to be prepared. When the sliced primary sandwich cone 610 is finished, the cone changing mechanism 216 can remove the primary sandwich cone 610 and put the heated replacement sandwich cone 612 in front of the sandwich heater 602. The details of operations of the cone changing mechanisms 216 are described in FIG. 11B.

Figure 7:
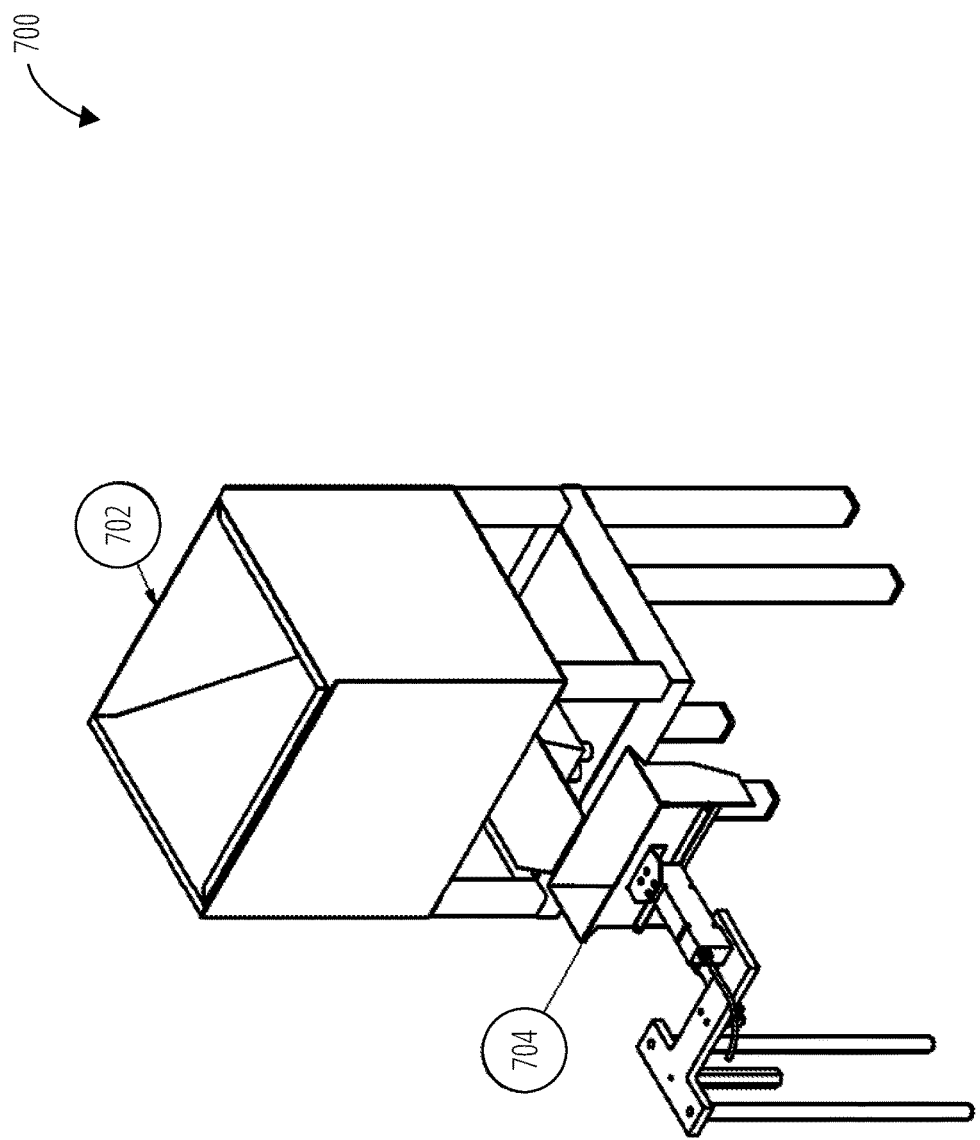
FIG. 7 illustrates a cheese section of the automatic sandwich machine, according to an example embodiment.

FIG. 7 illustrates a cheese section 220 of the automatic sandwich machine 100, according to an example embodiment. The cheese section 220 can be located above the wrapping section 222. The cheese section 220 may include a cheese container 702 and a cheese weighing container 704.

The cheese container 702 can be cooled by the compressor 228 and include sliced cheese. The cheese can be supplied to the cheese weighing container 704 by shaking the cheese container 702 using vibrators. After the cheese weighing container 704 collects a pre-determined amount of cheese, a processor of the automatic sandwich machine 100 can cause vibrators to stop shaking the cheese container 702. The pre-determined amount of cheese can be measured by weight sensors.

It should be noted that the sandwich section 600 can prepare a pre-determined amount of meat, the cheese section 220 can prepare a pre-determined amount of cheese, and the topping section can prepare a combination of toppings simultaneously with the bread heater heating the bread piece. As described above, the amounts of meat, cheese, and toppings to be added to the bread piece can be measured by weights. In other embodiments, any of these amounts can be measured by volumes.

Figure 8:
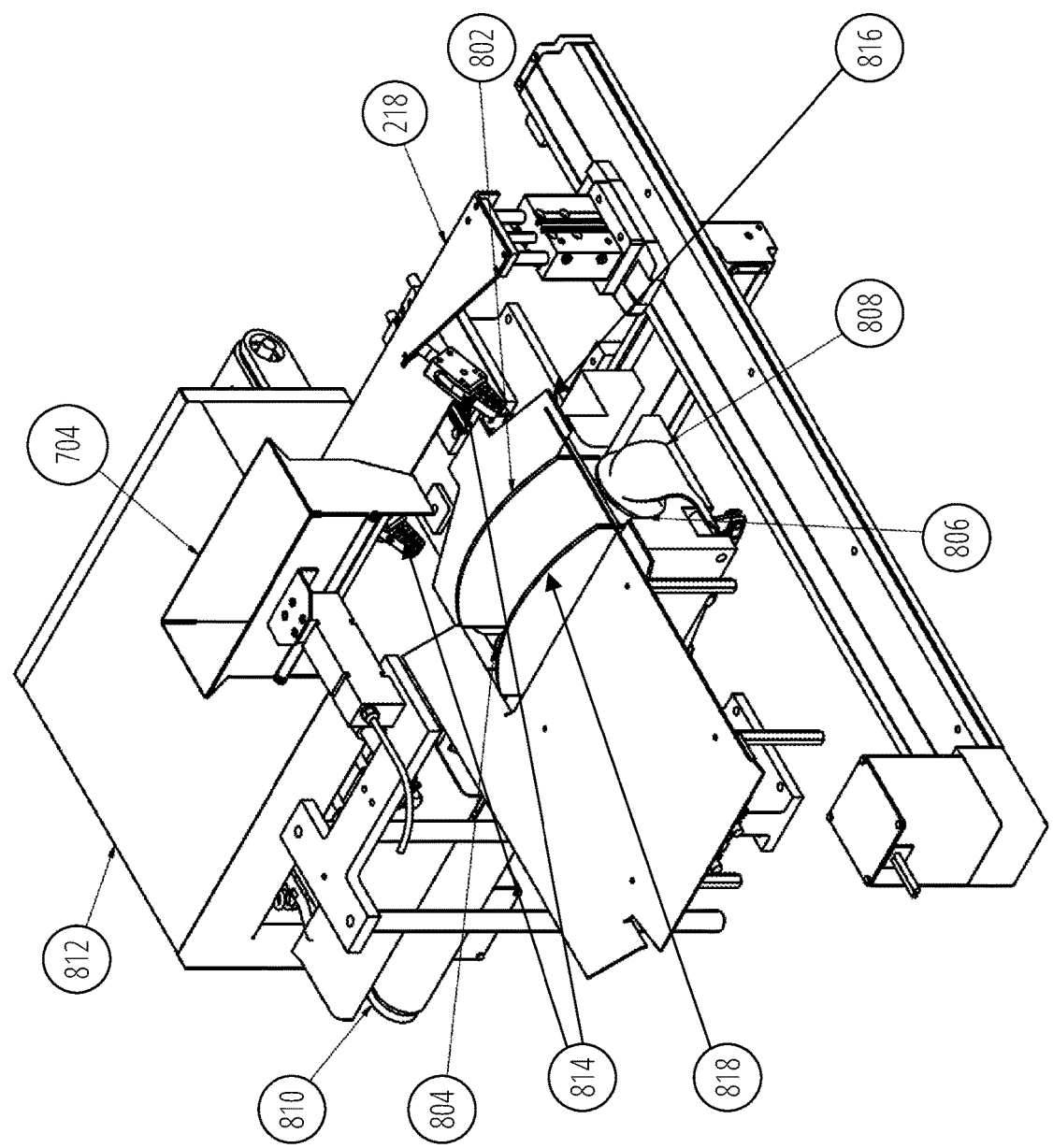
FIG. 8 illustrates a wrapping section of the automatic sandwich machine, according to an example embodiment.

FIG. 8 illustrates a wrapping section 222 of the automatic sandwich machine 100, according to an example embodiment. The wrapping section 222 may include a third arm 218, a wrapping mold 802, a folding arm 804, a folding arm 806, a folding arm 816, and a sandwich transferring arm 808.

The third arm 218 may include grabbing arms 814 that can be used to take two opposite sides of the bread piece 818 bent by the boards 412 when the bread piece 818 is located at the end of the main conveyor 210. Then, the third arm 218 can move the bread piece 818 and position it on top of the wrapping mold 802. After the bread piece 818 is positioned over the wrapping mold 802, the cheese weighing container 704 can move down and push the bread piece 818 inside the wrapping mold 802. After the bread piece 818 is pushed inside the wrapping mold 802, the cheese weighing container 704 can place the pre-determined amount of cheese on the bread piece 818. After placing the cheese, the cheese weighing container 704 can move up to the cheese container 702 (shown in FIG. 7) for the next portion of cheese.

After the cheese weighing container 704 moves up, the folding arms 806 and 816 can fold two opposite side of the bread piece 818. The folding arm 804 and another folding arm (obstructed in FIG. 8) can fold two other opposite sides of the bread piece 818 to form a sandwich. The sandwich transferring arm 808 can push the sandwich to the sandwich roasting conveyor 810. The sandwich roasting conveyor 810 can move the sandwich inside the sandwich roaster 224. The sandwich roaster 224 can roast the sandwich while it is moved by sandwich roasting conveyor 810. The sandwich roasting conveyor 810 may include heating elements to roast the side of the sandwich not exposed to the sandwich roaster 224.

Figure 9:
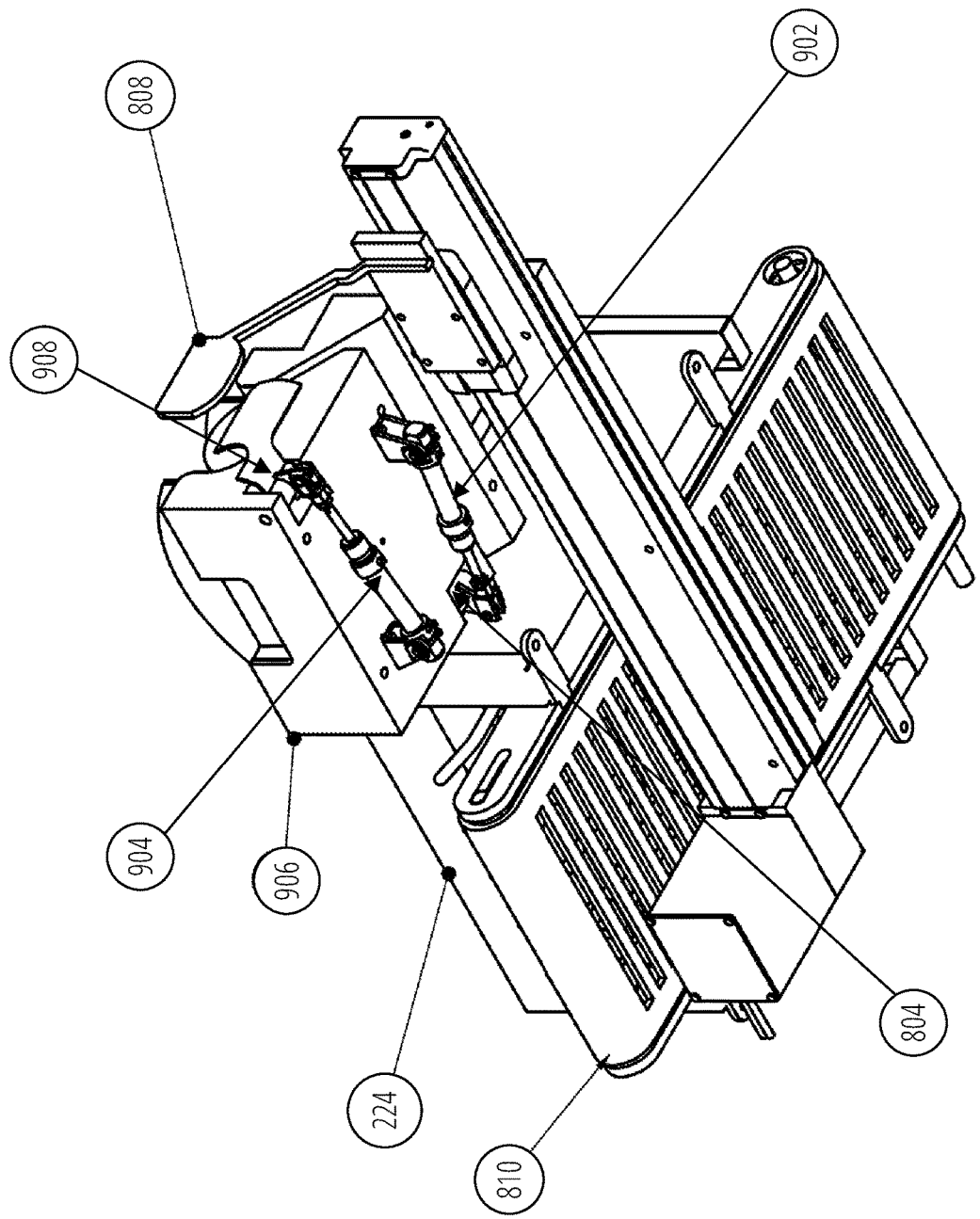
FIG. 9 shows a bottom angle view of the wrapping section, according to an example embodiment.

FIG. 9 shows a bottom angle view of the wrapping section 222, according to an example embodiment. FIG. 9 shows a wrapping mold 906, a sandwich transferring arm 808, a folding arm 816, a folding arm 804, a driver 902, and a driver 904. After the bread piece is placed into the wrapping mold 802, the drivers 902 and 904 can move the folding arm 804 and folding arm 908 toward the bread piece, thereby folding the bread piece from two opposite sides. The folding arms 806 and 816 (shown in FIG. 8) can fold the bread piece from two other opposite side to form a sandwich. The sandwich transferring arm 808 can then push the sandwich to the sandwich roasting conveyor 810. The sandwich roasting conveyor 810 can move the sandwich through the sandwich roaster 224.

Figure 10:
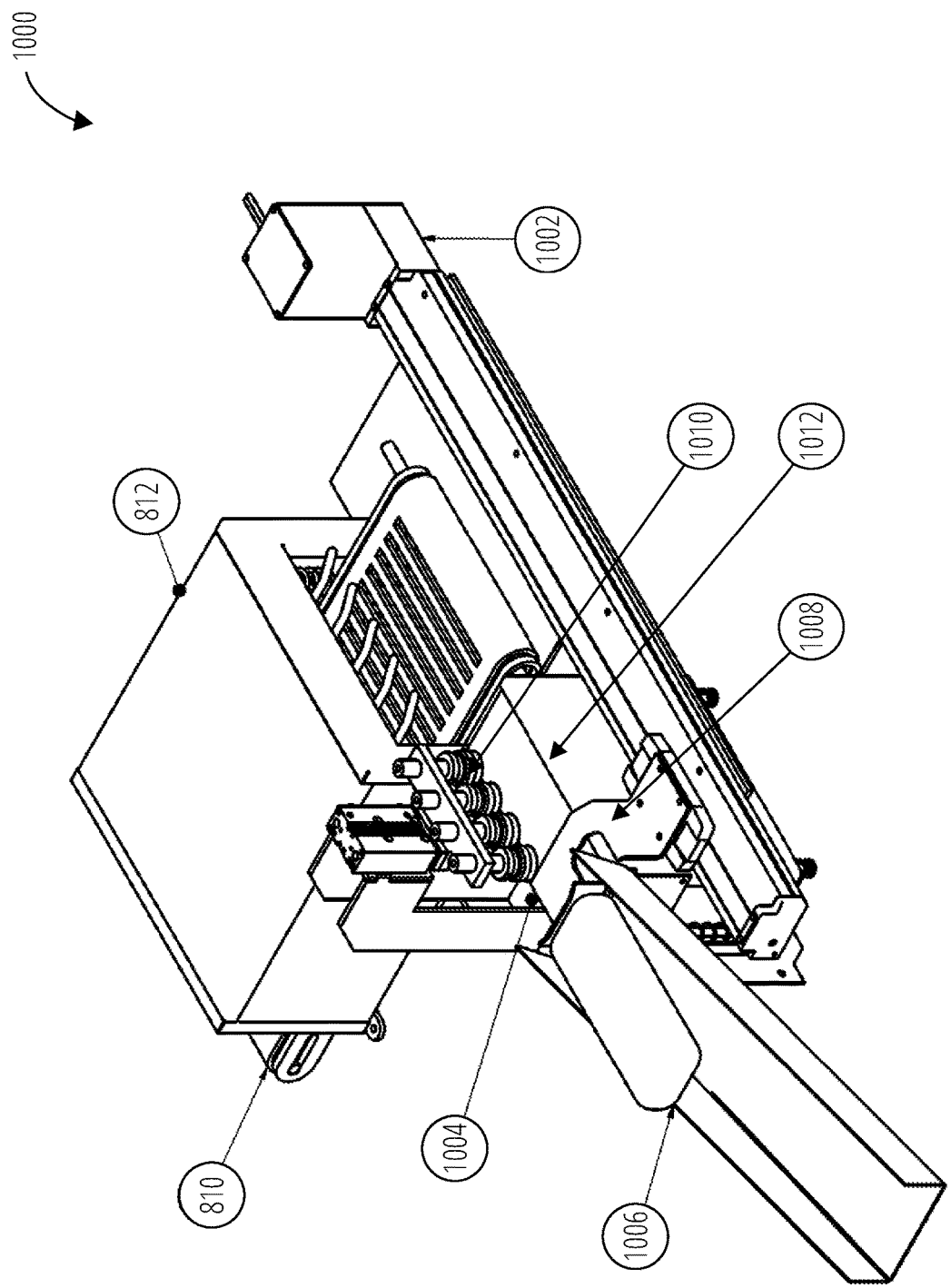
FIG. 10 illustrates a packaging and outlet section of the automatic sandwich machine, according to an example embodiment.

FIG. 10 illustrates a packaging and outlet section 1000 of the automatic sandwich machine, according to an example embodiment. The packaging and outlet section 1000 may include a fourth arm 1008, a fourth arm driver 1002, a packet container 1012, a sandwich packaging device 1004, vacuum suction pads 1010, and a sandwich outlet 1006.

The packet container 1012 may hold a stack of packets. The sandwich packaging device 1004 can move the vacuum suction pads 1010 towards the packet container 1012. The vacuum suction pads 1010 can attract a packet from the stack. Then, the sandwich packaging device 1004 can move the vacuum suction pads 1010 outwards of the packet container 1012, thereby opening the packet.

When the sandwich is moved by the sandwich roasting conveyor 810 outside the sandwich roaster 812, the sandwich packaging device 1004 can drive the fourth arm 1008 to push the sandwich from the sandwich roasting conveyor 810 inside the opened package. Then, the fourth arm 1008 can push the package containing the sandwich to the sandwich outlet, thus allowing a customer to receive the ordered sandwich.

Figure 11A:
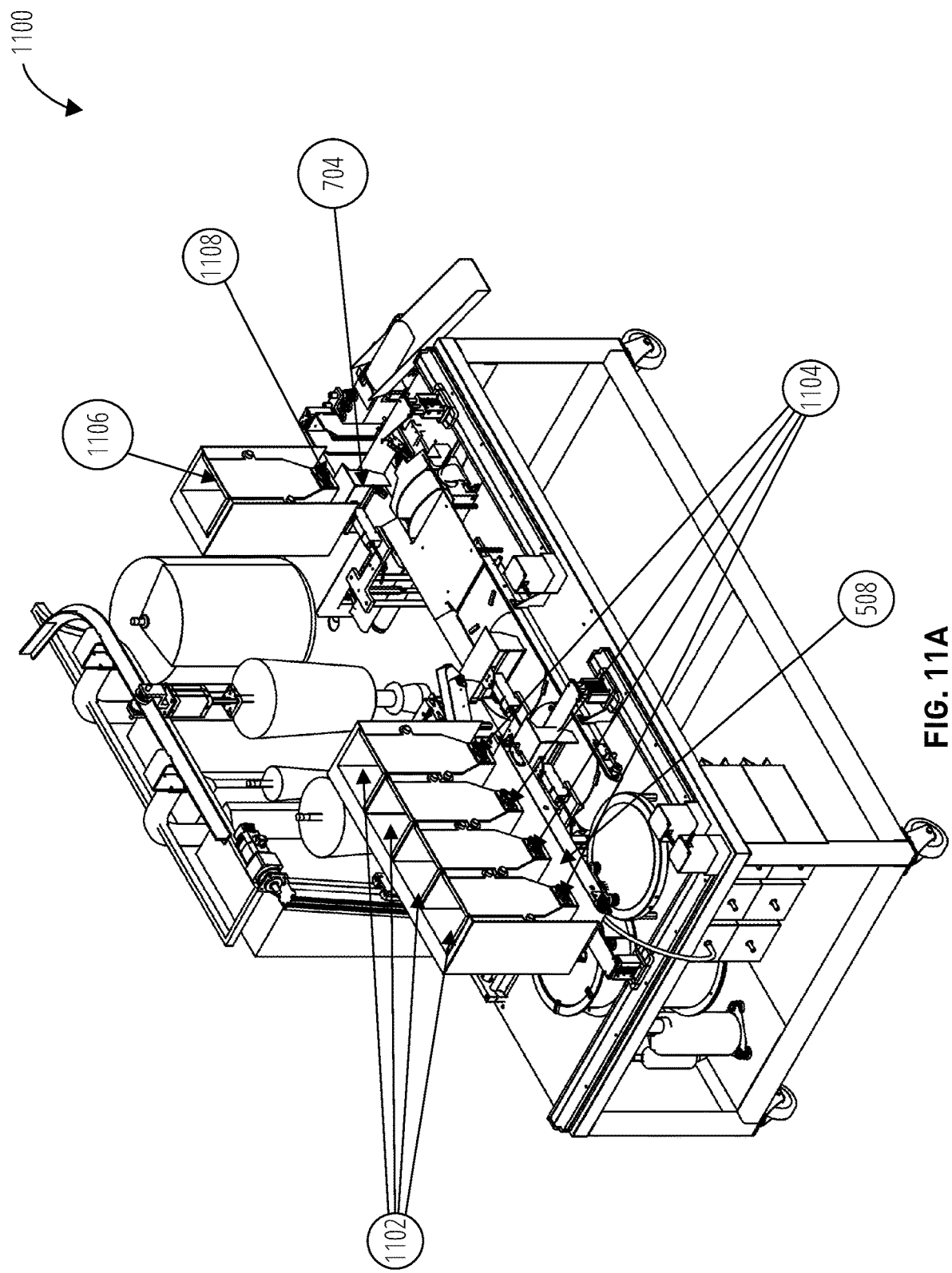
FIG. 11A illustrates an elevated view of an automatic sandwich machine, according to another example embodiment.

FIG. 11A illustrates an elevated view of an automatic sandwich machine 1100, according to another example embodiment. The automatic sandwich machine 1100 may include topping containers 1102 and cheese container 1106. The topping containers 1102 and cheese container 1106 are different than topping containers 502 (shown in FIG. 5) and cheese container 702 (shown in FIG. 7). Specifically, the topping containers 1102 each may include a wheel 1104 at the bottom. The wheels 1104 each may include prongs. While the wheels 1104 are rotating, the prongs may grab toppings located above the prongs in the topping containers 1102. The toppings can be released on the topping conveyor 508 (also shown in FIG. 5) when the prongs are turned down. The amount of toppings released from the topping containers 1102 can be controlled by speed and number of rotations of the wheels 1104. If a customer does not select one or more of the toppings, the wheels 1104 of the topping containers 1102 corresponding to unselected toppings are not rotated.

Similarly, the cheese container 1106 may include a wheel 1108 at the bottom. The wheel 1108 may include prongs. While the wheel 1108 is rotating, the prongs can grab the cheese located above the prongs in the cheese container 1106. The cheese is released into the cheese weighing container 704 (also shown in FIG. 7) when the prongs are down. The amount of cheese released from the cheese container 1106 can be controlled by speed and number of rotations of the wheel 1108. For example, when the cheese weighing containers 704 determines that it has collected a pre-determined amount of cheese, the wheel 1108 can be stopped. If a customer does not select the cheese, the wheel 1108 is not rotated.

Figure 11B:
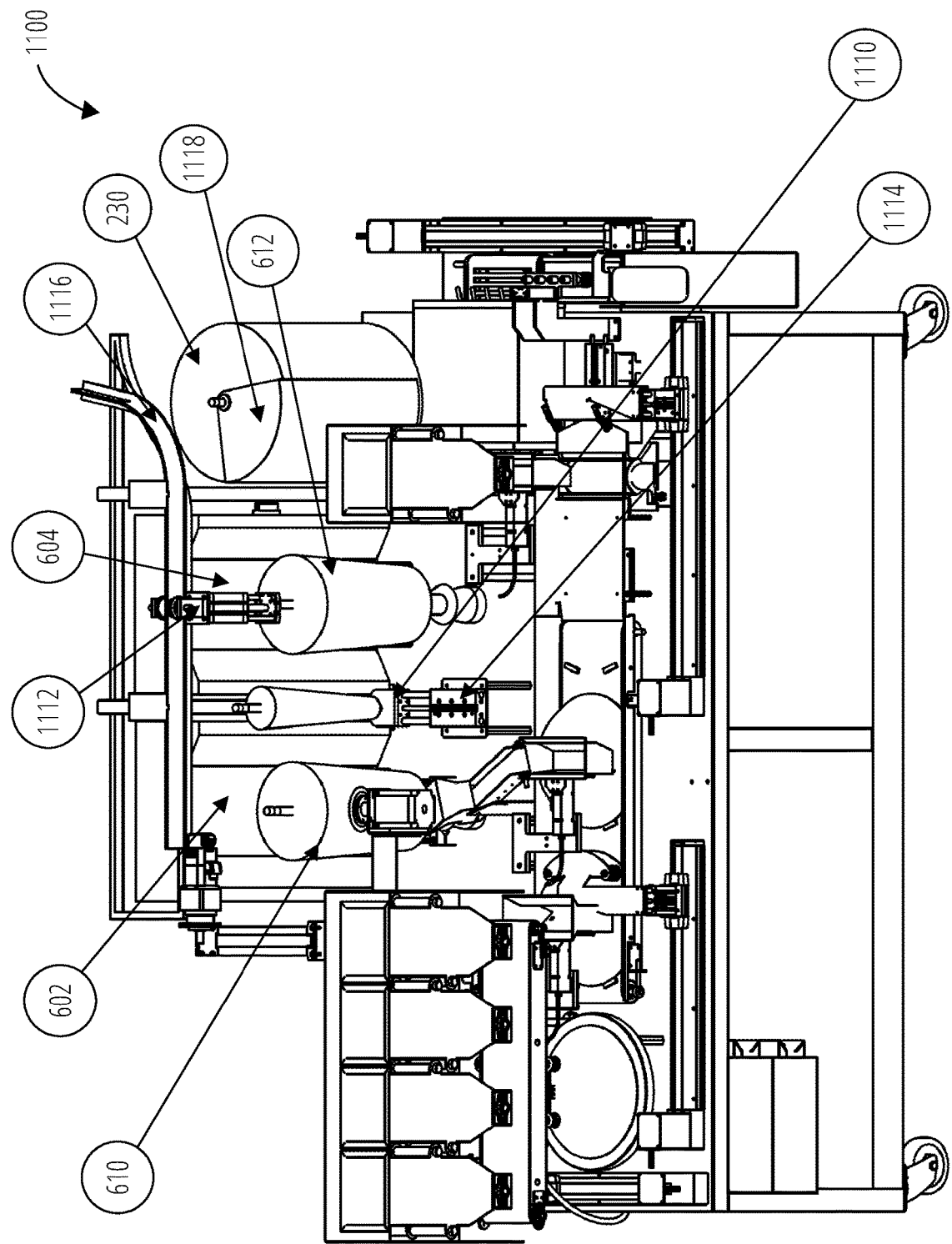
FIG. 11B illustrates a front view of an automatic sandwich machine, according to another example embodiment.

FIG. 11B illustrates a front view of an automatic sandwich machine 1100, according to another example embodiment. FIG. 11B provides details of operations of cone changing mechanisms 216 shown in FIG. 2 and FIG. 6.

When the sliced primary sandwich cone 610 is close to being completely used, the door 1118 of the cone freezer 230 can be opened. The level of usage of the primary sandwich cone 610 can be measured using photosensors or infrared sensors. The electromechanical drive 1112 can move along a rail 1116, grab the replacement sandwich cone 612 located in the cone freezer 230 and transfer the replacement sandwich cone 612 in the front of the sandwich heater 604. The purpose of the sandwich heater 604 is to start cooking the replacement sandwich cone 612 while the primary sandwich cone 610 is still located in front of the sandwich heater 602. This may allow reducing time needed to change the primary sandwich cone 610 with the replacement sandwich cone 612 because it may take between 15 and 20 minutes to prepare the replacement sandwich cone 612 for cutting. Therefore, starting preparing the replacement sandwich cone 612 while the primary sandwich cone 610 is close to being completely used may help avoiding customers to waste time during change of the primary sandwich cone 610 with the replacement sandwich cone 612.

When the sliced primary sandwich cone 610 is finished, the electromechanical drive 1112 can move along the rail 1116, grab the sliced primary sandwich cone 610 and transfer the sliced primary sandwich cone 610 to the middle platform 1110. The electromechanical drive 1114 can move the middle platform 1110 with the sliced primary sandwich cone 610 to a position between the sandwich heater 602 and the sandwich heater 604, such that the sliced primary sandwich cone 610 could not be located under the rail 1116. This may allow moving the replacement sandwich cone 612 from the sandwich heater 604 to the sandwich heater 602. After the electromechanical drive 1112 moves the replacement sandwich cone 612 from the sandwich heater 602 to the sandwich heater 604, the electromechanical drive 1114 can move the sliced primary sandwich cone 610 back in a position under the rail 1116. Then electromechanical drive 1112 can grab the sliced primary sandwich cone 610 and move it into the cone freezer 230.

Figure 12A:
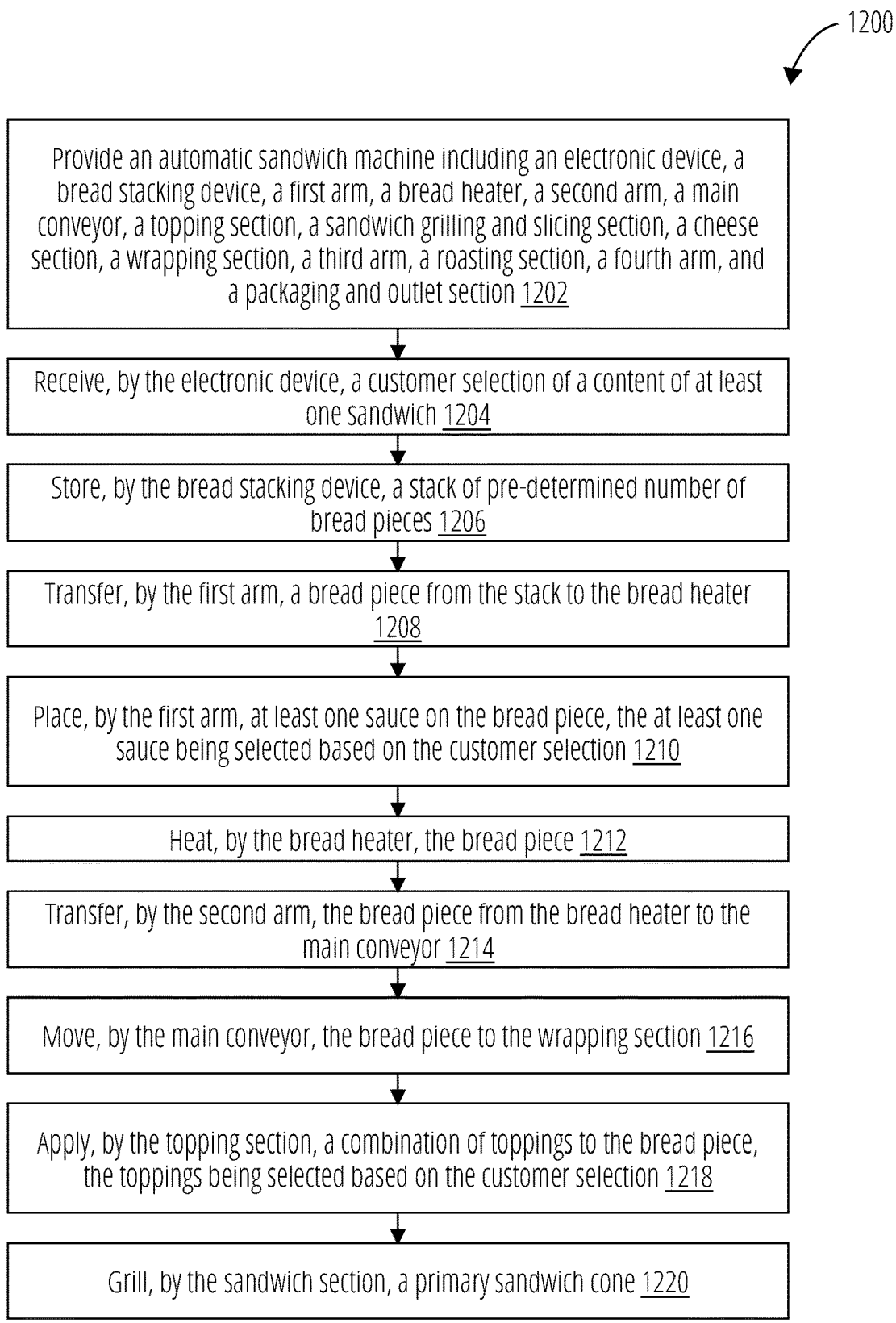
FIG. 12A and FIG. 12B illustrate a method for preparing sandwiches, in accordance with an example embodiment.
Figure 12B:
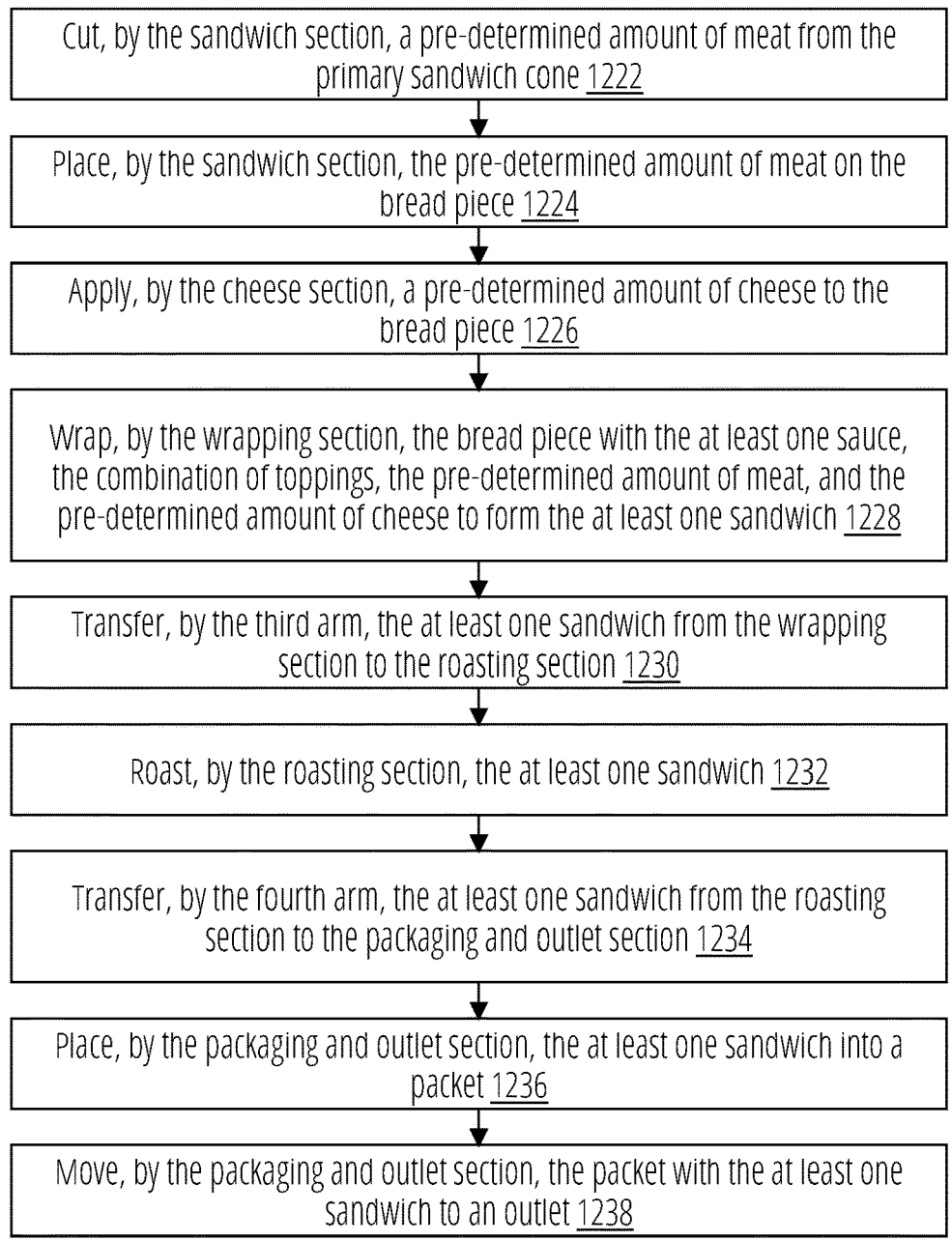

FIG. 12A and FIG. 12B illustrate a method 1200 for preparing sandwiches in accordance with an example embodiment. In some embodiments, the operations of the method 1200 may be combined, performed in parallel, or performed in a different order. The method 1200 may also include additional or fewer operations than those illustrated.

In block 1202, the method 1200 may include providing an automatic sandwich machine including an electronic device, a bread stacking device, a first arm, a bread heater, a second arm, a main conveyor, a topping section, a sandwich grilling and slicing section, a cheese section, a wrapping section, a third arm, a roasting section, a fourth arm, and a packaging and outlet section. The electronic device includes a point-of-sale enabling a customer to pay for the at least sandwich.

In block 1204, the method 1200 may include receiving, by the electronic device, a customer selection of a content of at least one sandwich. In block 1206, the method 1200 may include storing, by the bread stacking device, a stack of a pre-determined number of bread pieces.

In block 1208, the method 1200 may include transferring, by the first arm, a bread piece from the stack to the bread heater. The first arm may include a set of vacuum suction pads. The set of vacuum suction pads can hold and release the bread piece.

In block 1210, the method 1200 may include placing, by the first arm, at least one sauce on the bread piece. The at least one sauce can be selected based on the customer selection. The first arm may include a set of nozzles. The set of nozzles dispenses the at least one sauce when the first arm moves from the bread heater to the bread stacking device. The automatic sandwich machine may include a set of sauce containers disposed below the bread heater. The set of sauce containers can supply the at least one sauce to the set of nozzles via a set of hoses. The set of sauce containers may include at least two containers storing the at least one sauce.

In block 1212, the method 1200 may include heating, by the bread heater, the bread piece. In block 1214, the method 1200 may include transferring, by the second arm, the bread piece from the bread heater to the main conveyor.

In block 1216, the method 1200 may include moving, by the main conveyor, the bread piece to the wrapping section. The first arm can transfer the bread piece along a first direction. The main conveyor can move the bread piece along a second direction. The first direction can be substantially orthogonal to the second direction.

In block 1218, the method 1200 may include applying, by the topping section, a combination of toppings to the bread piece. The toppings can be selected based on the customer selection.

In block 1220, the method 1200 may include grilling, by the sandwich section, a primary sandwich cone. In block 1222, the method 1200 may include cutting, by the sandwich section, a pre-determined amount of meat off the primary sandwich cone. In block 1224, the method 1200 may include placing, by the sandwich section, the pre-determined amount of meat on the bread piece. The automatic sandwich machine can include a cone freezer and a compressor. The cone freezer stores a replacement sandwich cone and the compressor cools the cone freezer. The sandwich section may include a cone changing mechanism. The cone changing mechanism automatically replaces the primary sandwich cone with the replacement sandwich cone.

In block 1226, the method 1200 may include applying, by the cheese section, a pre-determined amount of cheese to the bread piece. The sandwich section can prepare the pre-determined amount of meat, the cheese section can prepare the pre-determined amount of cheese, and the topping section can prepare the combination of toppings while the bread heater is heating the bread piece.

The cheese section can be disposed above the wrapping section. The cheese section can add the pre-determined amount of cheese to the bread piece and push the bread piece into a mold of the wrapping section.

In block 1228, the method 1200 may include wrapping, by the wrapping section, the bread piece with the at least one sauce, the combination of toppings, the pre-determined amount of meat, and the pre-determined amount of cheese to form the at least one sandwich.

In block 1230, the method 1200 may include transferring, by the third arm, the at least one sandwich from the wrapping section to the roasting section.

In block 1232, the method 1200 may include roasting, by the roasting section, the at least one sandwich.

In block 1234, the method 1200 may include transferring, by the fourth arm, the at least one sandwich from the roasting section to the packaging and outlet section.

In block 1236, the method 1200 may include placing, by the packaging and outlet section, the at least one sandwich into a packet.

In block 1238, the method 1200 may include moving, by the packaging and outlet section, the packet with the at least one sandwich to an outlet.

Thus, an automatic sandwich machine and a method for preparing sandwiches are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. An automatic sandwich machine comprising:
a touch screen, a first arm, a bread heater, a second arm, a main conveyor, a topping section, a sandwich section, a cheese section, a wrapping section, a third arm, a roasting section, a fourth arm, and a packaging and outlet section, wherein:
the touch screen is configured to receive a customer selection of a content of at least one sandwich;
the first arm is configured to transfer a bread piece from a stack of a pre-determined number of bread pieces to the bread heater and place at least one sauce on the bread piece, the at least one sauce being selected based on the customer selection;
the bread heater is configured to heat the bread piece;
the second arm is configured to transfer the bread piece from the bread heater to the main conveyor;
the main conveyor is configured to move the bread piece to the wrapping section;
the topping section is configured to apply a combination of toppings to the bread piece, the toppings being selected based on the customer selection;
the sandwich section is configured to grill a primary sandwich cone, cut a pre-determined amount of meat from the primary sandwich cone, and place the pre-determined amount of meat on the bread piece;
the cheese section configured to apply a pre-determined amount of cheese to the bread piece;
the wrapping section is configured to wrap the bread piece with the at least one sauce, the combination of toppings, the pre-determined amount of meat, and the pre-determined amount of cheese to form the at least one sandwich;
the third arm is configured to transfer the at least one sandwich from the wrapping section to the roasting section;
the roasting section is configured to roast the at least one sandwich;
the fourth arm is configured to transfer the at least one sandwich from the roasting section to the packaging and outlet section; and
the packaging and outlet section is configured to place the at least one sandwich into a packet and move the packet with the at least one sandwich to an outlet.

2. The automatic sandwich machine of claim 1, wherein:
the first arm transfers the bread piece along a first direction; and
the main conveyor moves the bread piece along a second direction, wherein
the first direction is substantially orthogonal to the second direction.

3. The automatic sandwich machine of claim 1, wherein the first arm includes a set of vacuum suction pads configured to hold and release the bread piece.

4. The automatic sandwich machine of claim 1, wherein the first arm includes a set of nozzles configured to dispense the at least one sauce when the first arm moves from the bread heater toward the stack.

5. The automatic sandwich machine of claim 4, further comprising a set of sauce containers disposed below the bread heater and configured to supply the at least one sauce to the set of nozzles via a set of hoses, the set of sauce containers including two containers storing the at least one sauce.

6. The automatic sandwich machine of claim 1, wherein:
the sandwich section prepares the pre-determined amount of meat, the cheese section prepares the pre-determined amount of cheese, and the topping section prepares the combination of toppings while the bread heater is heating the bread piece.

7. The automatic sandwich machine of claim 1, further comprising:
a cone freezer configured to store a replacement sandwich cone; and
a compressor configured to cool:
the cone freezer, wherein the sandwich section includes a cone changing mechanism configured to automatically replace the primary sandwich cone with the replacement sandwich cone;
containers of the topping section, the containers being configured to store the toppings; and
a cheese container of the cheese section, the cheese container being configured to store the cheese.

8. The automatic sandwich machine of claim 1, wherein the cheese section is disposed above the wrapping section.

9. The automatic sandwich machine of claim 8, wherein the cheese section is configured to add the pre-determined amount of cheese to the bread piece and push the bread piece into a mold of the wrapping section.

10. The automatic sandwich machine of claim 1, further comprising a point-of-sale enabling a customer to pay for the at least one sandwich.

\* \* \* \* \*